(No Model.)

A. M. SOUTHARD.
BABY SEAT FOR BICYCLES.

No. 541,817. Patented June 25, 1895.

WITNESSES:
Chas. E. Dawson
Horace P. Carson

INVENTOR
A. M. Southard
BY
A. J. O'Brien
ATTORNEY

THE NORRIS PETERS CO., PHOTO-LITHO., WASHINGTON, D. C.

UNITED STATES PATENT OFFICE.

ABRAHAM M. SOUTHARD, OF DENVER, COLORADO.

BABY-SEAT FOR BICYCLES.

SPECIFICATION forming part of Letters Patent No. 541,817, dated June 25, 1895.

Application filed April 4, 1895. Serial No. 544,381. (No model.)

*To all whom it may concern:*

Be it known that I, ABRAHAM M. SOUTHARD, a citizen of the United States of America, residing at Denver, in the county of Arapahoe and State of Colorado, have invented certain new and useful Improvements in Baby-Seats for Bicycles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in baby seats for bicycles, and consists of the features hereinafter described and claimed, all of which will be fully understood by reference to the accompanying drawings in which is illustrated an embodiment thereof.

Figure 1:
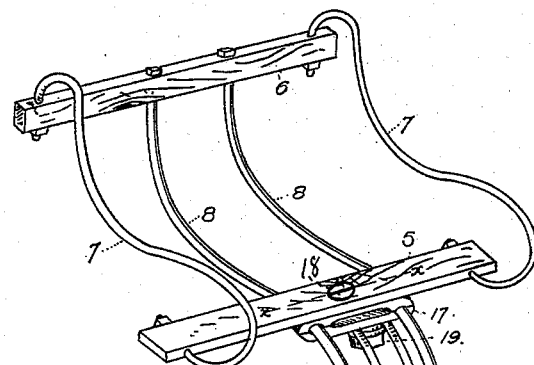
Figure 3:
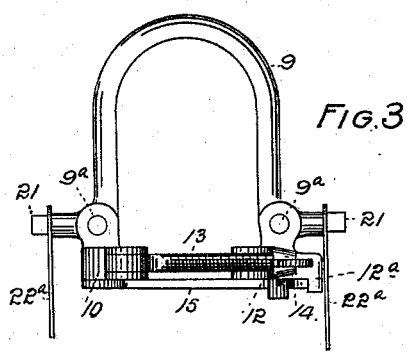
Figure 2:
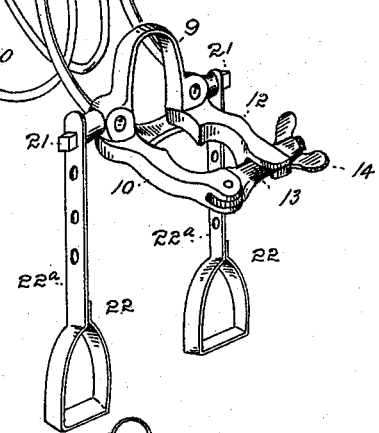
Figure 4:
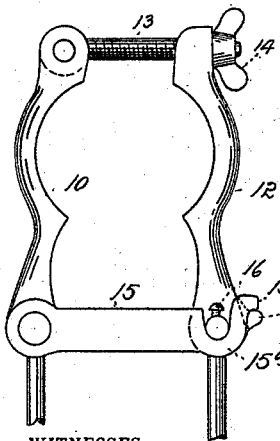
Figure 5:
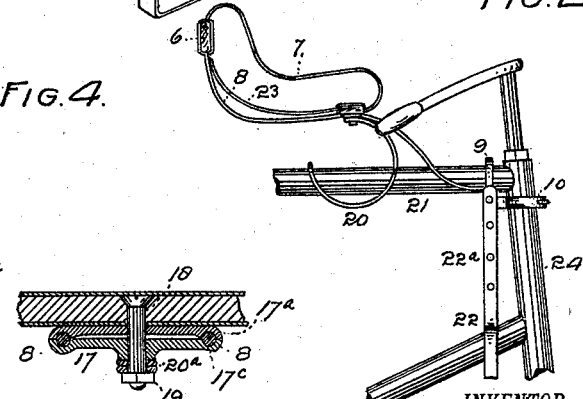

In the drawings, Figure 1 is a perspective view of my improved baby seat. Fig. 2 is a side elevation of the seat, shown on a smaller scale, and attached to the frame of a bicycle. Fig. 3 is a front elevation of the clamp; and Fig. 4 is an underneath view thereof. Fig. 5 is a section taken on the line $x-x$, Fig. 1.

Similar reference characters indicating corresponding parts in the views, let the numerals 5 and 6 designate two pieces, preferably composed of wood, and forming the front and rear parts respectively of the seat frame. The two parts 5 and 6 are connected by two side wires 7 whose extremities are passed through apertures formed in said parts, and threaded to receive fastening nuts. Between the wires 7 are located the spring-arms 8 which are attached to the pieces 5 and 6, extend forwardly from the seat frame and enter apertures $9^a$ formed in the yoke 9 of the clamp. To the lower extremities of the yoke-arms are hinged the arms 10 and 12 of the clamp. To the outer extremity of the clamp-arm 10 is hinged a threaded pin 13. The clamp-arm 12 is forked to receive this pin. To the free extremity of the pin is applied a thumb-nut 14. By turning this nut, the clamp-arms are adjusted. The clamp arms are adapted to fit the steering post of a bicycle frame. To this end, they are concaved whereby they may be made to grasp the said post on two opposite sides.

To one arm of the yoke 9, namely, the yoke-arm to which the clamp-arm 10 is attached is hinged the latch 15 whose free extremity is hook-shaped as shown at $15^a$ and adapted to engage the lower extremity of the opposite yoke-arm. When the hook $15^a$ of the latch is in engagement with its corresponding yoke-arm, it is locked in place by a lug $12^a$ formed on the clamp-arm 12 and adapted to engage a projection $15^c$ on the hook of the latch. The clamp-arm 12 is prevented from slipping off the yoke by a set screw 16. The spring-arms 8 pass beneath the front wood strip 5 and are secured thereto by a two-part clasp 17 applied to the under surface of the strip 5 and held in place by a screw 18 passed through coinciding apertures formed in the strip 5 and the two parts $17^a$ and $17^c$ of the clasp. The screw is held in place by a nut 19 applied to its lower extremity. The outer extremities of the clasp-parts are interiorly recessed to fit the spring-arms 8. An auxiliary spring 20 is attached to the screw 18 and curves downwardly and rearwardly. This spring is double and adapted to straddle the top bar 21 of the bicycle frame. The spring 20 is formed of a single piece of wire, and its extremities $20^a$ are bent around the screw 18 between the nut 19 and clasp-part $17^c$.

The arms 8 where they enter the apertures $9^a$ of the yoke 9 are locked in any desired position of adjustment by small set bolts 21 which enter apertures in the yoke formed at right angles to the apertures $9^a$ and communicate therewith. Hence, the set bolts may be screwed to engagement with the arms 8. The set bolts 21 also form supports for the stirrups 22 which are apertured to receive said bolts. These stirrups are composed of metal, and each strap or arm $22^a$ is provided with a series of apertures whereby the stirrups may be adjusted to conform to the requirements of different sized children.

A flexible covering 23 is applied to the seat frame, being attached to the wood strips 5 and 6 in the front and rear.

In use, the seat is attached to the bicycle by securing the clamp to the steering post 24. This clamp engages said post below the cross-bar 21 which the yoke 9 engages. Before attaching the seat, the latch 15 is unlocked and opened to allow the cross-bar 21 to pass between the yoke-arms; the hook of the latch is then thrown to the position shown in Fig. 4, and the clamp-arms 10 and 12 tightened by screwing up the thumb-nut. This brings the lug $12^a$ to engagement with the projection $15^c$ and locks the latch securely in place. It will thus be seen that the clamp is quickly and easily applied to the bicycle frame.

Having thus described my invention, what I claim is—

1. In a baby seat for bicycles, the combination with the seat frame having the forwardly extending arms, of the clamp comprising the yoke, the clamp-arms hinged to the yoke-arms, the latch hinged to one of the yoke-arms and adapted to engage the other arm, its free extremity being provided with a projection adapted to engage a lug on one of the clamp-arms, a threaded pin hinged to one of the clamp-arms and adapted to engage the forked extremity of the other arm, and an adjusting nut engaging said pin, substantially as described.

2. In a baby seat for bicycles, the combination with the seat frame having the forwardly extending spring-arms, of the clamp comprising the yoke, the clamp-arms hinged to the yoke, the latch hinged to one of the yoke-arms, its free extremity being fashioned to engage the other arm, the adjacent clamp-arm being adapted to engage the free extremity of the latch and lock the latter in place, substantially as described.

3. The clamp comprising the yoke, the clamp-arms hinged to the yoke-arms, the threaded pin hinged to one clamp-arm and adapted to enter the forked extremity of the other arm, a fastening nut applied to said pin, and a latch hinged to one of the yoke-arms and fashioned to engage the other arm, one of the clamp-arms being fashioned to engage the free extremity of the latch and lock the latter in position, substantially as described.

In testimony whereof I affix my signature in the presence of two witnesses.

ABRAHAM M. SOUTHARD.

Witnesses:
   CHAS. E. DAWSON,
   ALFRED J. O'BRIEN.